United States Patent
Son (10) Patent No.: US 10,764,888 B2
(45) Date of Patent: Sep. 1, 2020

(54) METHOD AND APPARATUS TO RECEIVE AND TRANSMIT DATA IN A MOBILE COMMUNICATION SYSTEM WITH MULTIPLE SCS

(71) Applicant: Yeongmoon Son, Yongin-si (KR)

(72) Inventor: Yeongmoon Son, Yongin-si (KR)

( * ) Notice: Subject to any disclaimer, the term of this patent is extended or adjusted under 35 U.S.C. 154(b) by 35 days.

(21) Appl. No.: 16/046,736

(22) Filed: Jul. 26, 2018

(65) Prior Publication Data

US 2019/0037559 A1 Jan. 31, 2019

Related U.S. Application Data

(60) Provisional application No. 62/537,913, filed on Jul. 27, 2017.

(51) Int. Cl.
```
H04W 72/04      (2009.01)
H04W 48/12      (2009.01)
H04W 56/00      (2009.01)
```

(52) U.S. Cl.
CPC ....... *H04W 72/0446* (2013.01); *H04W 48/12* (2013.01); *H04W 56/001* (2013.01)

(58) Field of Classification Search
CPC ............. H04W 72/0446; H04W 48/12; H04W 56/001
See application file for complete search history.

(56) References Cited

U.S. PATENT DOCUMENTS

| | | | | |
|---|---|---|---|---|
| 9,820,298 | B2* | 11/2017 | Dinan | H04L 5/0091 |
| 2008/0084849 | A1 | 4/2008 | Wang et al. | |
| 2015/0124787 | A1 | 5/2015 | Dinan | |
| 2016/0345348 | A1* | 11/2016 | Chae | H04W 76/14 |
| 2016/0352551 | A1* | 12/2016 | Zhang | H04L 5/0007 |
| 2017/0223677 | A1* | 8/2017 | Dinan | H04L 5/0091 |
| 2017/0311276 | A1* | 10/2017 | Tsai | H04L 27/2655 |
| 2019/0173655 | A1* | 6/2019 | Shimezawa | H04L 5/0092 |
| 2019/0174513 | A1* | 6/2019 | Loehr | H04W 72/14 |
| 2019/0222364 | A1* | 7/2019 | Shimoda | H04L 1/1819 |

OTHER PUBLICATIONS

Qualcomm Incorporated, 'Timing advance for different numerology', R1-1711208, 3GPP TSG RAN WG1 AdHoc #2, Qingdao, China, Jun. 17, 2017.
Huawei et al., 'Considerations on TA maintaining in HF cell', R2-1704611, 3GPP TSG RAN WG2 Meeting #98, Hangzhou, China, May 6, 2017.
Qualcomm Incorporated, 'UE Processing Time', R1-1711206, 3GPP TSG RAN WG1 AdHoc #2, Qingdao, China, Jun. 18, 2017.

* cited by examiner

*Primary Examiner* — Hassan Kizou
*Assistant Examiner* — Deepa Belur
(74) *Attorney, Agent, or Firm* — Novick, Kim & Lee, PLLC; Sang Ho Lee (57) ABSTRACT

Data transfer method and apparatus for use in a mobile communication system with multiple subcarrier spacings are provided. Method to adjust uplink transmission timing includes receiving TA from the base station, deriving an integer from the logical information received from the base station and determining the amount of uplink adjustment based on the integer.

9 Claims, 8 Drawing Sheets

METHOD AND APPARATUS TO RECEIVE AND TRANSMIT DATA IN A MOBILE COMMUNICATION SYSTEM WITH MULTIPLE SCS

CROSS-REFERENCE TO RELATED APPLICATION

This application claims the priority and benefit of U.S. Provisional Patent Application No. 62/537,913, filed Jul. 27, 2017, the disclosure of which is incorporated herein by reference.

BACKGROUND OF THE INVENTION

1. Field of the Invention

The present disclosure relates to a mobile communication system with multiple subcarrier spacings. More specifically, the present disclosure relates to a data transfer method and an apparatus for use in the mobile communication system with multiple subcarrier spacings.

2. Description of the Related Art

Mobile communication systems were developed to provide mobile users with communication services. With rapid technological advancements, the mobile communication systems have evolved to the level capable of providing high speed data communication service to support various QoS requirements.

In the mobile communication system called NR (Next Radio) which is being developed, to support various QoS requirement in various deployment scenarios, multiple subcarrier spacing need to be supported in a given serving cell, given frequency or given frequency bands.

OFDM based mobile communication systems so far use only a single subcarrier spacing and NR is the first mobile communication system using multiple subcarrier spacings.

Therefore, a need exists for a method and an apparatus for facilitating uplink transmission timing adjustment in OFDM based mobile communication system with multiple subcarrier spacings.

SUMMARY

Aspects of the present disclosure are to address at least the above-mentioned problems. Accordingly, an aspect of the present disclosure is to provide a method and an apparatus for facilitating uplink transmission timing adjustment in OFDM based mobile communication system with multiple subcarrier spacings.

In accordance with an aspect of the present disclosure, an uplink transmission timing adjustment method of a terminal in mobile communication system with multiple subcarrier spacings is provided. In the method, UE considers various factors like RAT (Radio Access Technology), frame structure and SCS (Subcarrier spacing) in determining the amount of uplink timing adjustment. UE receives TA (Timing Advance) command from the node B. UE determines $N_{TA}$ based on the TA value indicated in the TA command and adjust the uplink transmission timing according to the $N_{TA}$. UE applies, according to the type of received TA command, either the $1^{st}$ method or $2^{nd}$ method to adjust the uplink transmission timing.

In the $1^{st}$ method, UE adjusts the uplink transmission timing, in one direction, by the amount of time determined by $N_{TA}$, from the starting boundary of a radio frame of the specific serving cell. The specific serving cell is the PCell and the radio frame is the downlink radio frame.

In the $2^{nd}$ method, UE adjusts the uplink transmission timing, in both directions, by the amount of time determined by $N_{TA}$, from the currently used/applied uplink transmission timing.

$N_{TA}$ is equal to TA multiplied by K. TA is indicated in the TA command. K is an integer greater than 0 and can be different depending on the cell. K is determined by a logical value indicated in the system information of the cell where uplink transmission timing adjustment is applied. Alternatively, K is determined by SCS of the cell where uplink transmission timing adjustment is applied.

In accordance with another aspect of the present disclosure, an uplink transmission timing adjustment method of a terminal in mobile communication system with multiple subcarrier spacings is provided. In the method, UE receives a control message, from a $1^{st}$ node B which controls the $1^{st}$ cell group, to configure the $2^{nd}$ cell group which is controlled by $2^{nd}$ node B which is different from the $1^{st}$ node B. UE configures the $2^{nd}$ cell group accordingly. UE receives TA command from a Node B, determines uplink timing adjustment considering the value indicated in the TA command and the cell group where TA command is received (or the cell group where random access procedure is performed or RAT of the cell where random access procedure is performed), and then adjust the uplink transmission timing. The $1^{st}$ cell group is the group of the serving cells whose RAT is $1^{st}$ RAT (e.g. LTE). The $2^{nd}$ cell group is the group of the serving cells whose RAT is $2^{nd}$ RAT (e.g. NR). If TA command is received from the $1^{st}$ cell group, $N_{TA}$ is calculated by multiplying TA and $1^{st}$ constant. If TA command is received from the $2^{nd}$ cell group, $N_{TA}$ is calculated by multiplying TA and $2^{nd}$ variables. $1^{st}$ constant is an integer with a fixed value specified in the specification. $2^{nd}$ variable is an integer with variable values which are determines by the SCS of the concerned serving cell. The mapping between the $2^{nd}$ variable and SCS is predetermined and specified in the specification. Alternatively, the $2^{nd}$ variable is an integer determined by the logical information in a control message received from MeNB. If TA command is received from the $1^{st}$ cell group, UE applies either 0 or predetermined integer as $N_{TA,offset}$ according to the frame structure of the concerned serving cell. If TA command is received from the $2^{nd}$ cell group, UE applies another predetermined integer as $N_{TA,offset}$ according to SCS of the concerned serving cell (or according to the logical information in a control message received from MeNB). If TA command is received from the $1^{st}$ cell group, UE applies/uses predefined value as time unit Ts for timing adjustment. If TA command is received from the $2^{nd}$ cell group, UE applies/uses another predefined value as time unit Ts for timing adjustment.

In accordance with another aspect of the present disclosure, an uplink transmission timing adjustment method of a terminal in mobile communication system with multiple subcarrier spacings is provided. In the method, UE receives, from $1^{st}$ Node B controlling the $1^{st}$ cell group, a control message configuring the $2^{nd}$ cell group. UE configures the $2^{nd}$ cell group according to the received the control message. UE adjusts uplink transmission timing based both on the TA value indicated in the TA command received from the Node B and on the cell group the TA command is received. If TA command is received from the $1^{st}$ cell group, UE determines uplink transmission timing for the $1^{st}$ RAT by multiplying $1^{st}$ constant by the sum of $N_{TA}$ and $N_{TA,offset}$. If TA command is received from the $2^{nd}$ cell group, UE determines uplink transmission timing for the $2^{nd}$ RAT by multiplying $2^{nd}$ variable by the sum of $N_{TA}$ and $N_{TA,offset}$. $1^{st}$ constant is a fixed integer predefined in the standard. $2^{nd}$ variable is integer determined by the SCS of the serving cell. The mapping between $2^{nd}$ variable and the SCS are predefined in the standard. The $2^{nd}$ variable can be the integer determined by the logical information in the control message received from MeNB. $1^{st}$ constant is the time unit for uplink timing adjustment. $1^{st}$ constant is predefined and there is only one $1^{st}$ constant. $2^{nd}$ variable is the time unit for uplink timing adjustment. $2^{nd}$ variable for a serving cell is chosen from plurality of predefined values.

DETAILED DESCRIPTION

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices devised so as to perform the same function regardless of a structure.

Therefore it is to be understood that, for example, a block diagram of the present specification shows a conceptual aspect of an illustrative circuit for embodying a principle of the present invention. Similarly, it is to be understood that all flowcharts, state transition views, pseudo-codes, and the like show various processes that may tangibly embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make unclear the gist of the present invention, it will be omitted.

Hereinafter, various exemplary embodiments of the present invention will be described in detail with reference to the accompanying drawings.

The following description with reference to the accompanying drawings is provided to assist in a comprehensive understanding of various embodiments of the present disclosures as defined by the claims and their equivalents.

Terminologies used in the disclosures are explained below. Numerology defines a specific time duration e.g. the length of an OFDM symbol. Numerology and subcarrier spacing (hereafter SCS) have one to one relationship. In LTE, SCS is 15 KHz and the length of an OFDM symbol is $\frac{1}{14}$ ms. In NR, SCS is either 15 KHz, 30 KHz, 60 KHz, 120 KHz or 240 KHz. The length of an OFDM symbol is inverse proportional to SCS. SCS, numerology and symbol length are corresponding each other and interchangeable in the disclosures. Subframe is time unit with 1 ms duration. Time slot (or slot) is time unit consisting with N symbols. N is either 7 or 14. Frame structure has same meaning as duplex mode. FS1 is FDD and FS2 is TDD.

Figure 1:
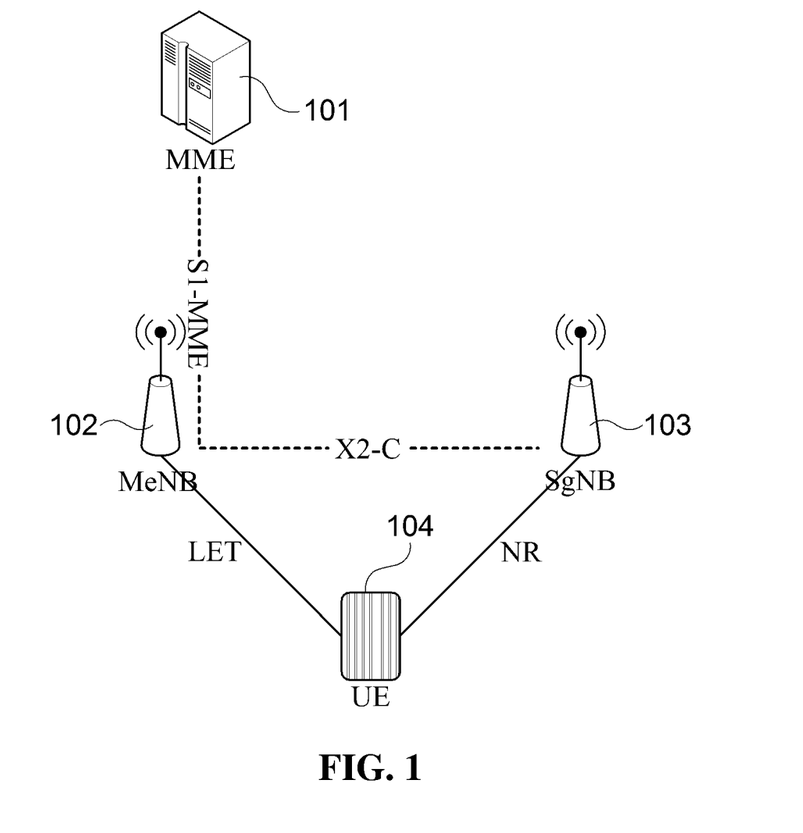
FIG. 1 is a diagram illustrating a mobile communication system architecture according to various embodiments of the present disclosure.

FIG. 1 is a diagram illustrating a mobile communication system architecture according to various embodiments of the present disclosure.

Referring to FIG. 1, MME (101) is connected to MeNB (102) via S1 interface. SgNB (103) is connected to MeNB (102) via X2 interface. UE is connected to MeNB (102) and SgNB (103) via a specific radio interface/RAT. UE transmit and receive data with MeNB via a group of cells. The RAT of those cells is LTE/E-UTRA. The group of cells used for communication with MeNB is the $1^{st}$ cell group (or Master Cell Group). UE transmit and receive data with SgNB via another group of cells. The RAT of those cells is NR. The group of cells used for communication with SgNB is the $2^{nd}$ cell group (or Secondary Cell Group).

Referring to FIG. 1, base station is illustrated as a single node. In the real implementation, base station can be comprised of plurality of nodes. For example, a central unit and plurality of distributed unit can be comprised of a single base station and plurality of cells controlled by the base station.

Figure 2:
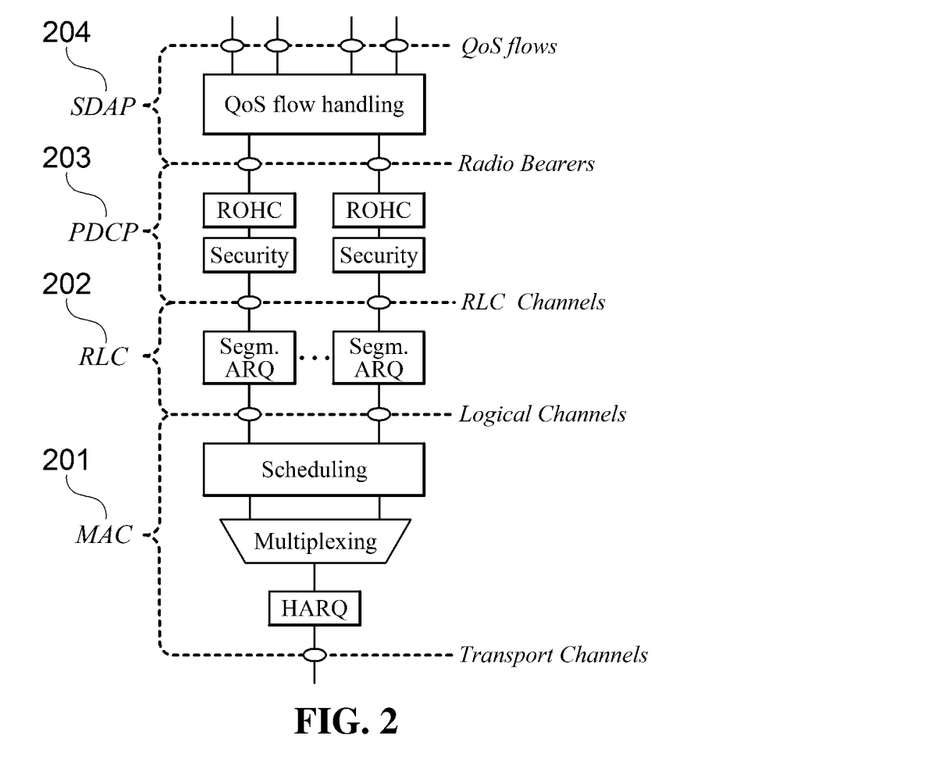
FIG. 2 is a diagram illustrating a protocol stack of a mobile communication system according to various embodiments of the present disclosure.

FIG. 2 is a diagram illustrating a protocol stack of a mobile communication system according to various embodiments of the present disclosure;

Referring to FIG. 2, Protocol stack of UE and base station is comprised of MAC (201), RLC (202), PDCP (203), SDAP (204). Multiple QoS flow/IP packet flows input to SDAP which distribute the IP packet to the appropriate PDCP. The RRC control message between UE and base station is exchanged via SR B (Signaling Radio Bearer). User data/IP packet between UE and base station is exchanged via DRB (Data Radio Bearer). Radio bearer is comprised of PDCP and RLC.

SDAP (Service Data Adaptation Protocol) layer handles QoS per data/service. More specifically, SDAP distribute IP packet received from the upper layer to the appropriate DRB. SDAP inspects SDAP header of the received SDAP PDU to apply reflective QoS. More details on reflective QoS can be found in TS 38.300.

PDCP (Packet Data Convergence Protocol) layer performs header compression/decompression, ciphering/deciphering and integrity protection. PDCP provides temporary lossless data transfer for the case where RLC cannot guarantee lossless data transfer.

RLC (Radio Link Control) layer process the RLC SDU received from PDCP to make the RLC PDU and submit it to the MAC layer. RLC layer performs ARQ (Automatic Retransmission Request) for RLC SDUs to ensure lossless data transfer.

MAC (Medium Access Control) layer multiplexes RLC PDUs, generated by multiple radio bearers configured in the UE, into MAC PDU and submit it to the physical layer. MAC layer demultiplexes RLC PDUs from MAC PDU and forward them to appropriate RLC entity. MAC performs specific operations required for data transfer with base station like random access or uplink timing adjustment.

In the present disclosure, uplink timing adjustment, uplink time adjustment and uplink time alignment are used interchangeably.

$1^{st}$ Embodiment

Figure 3:
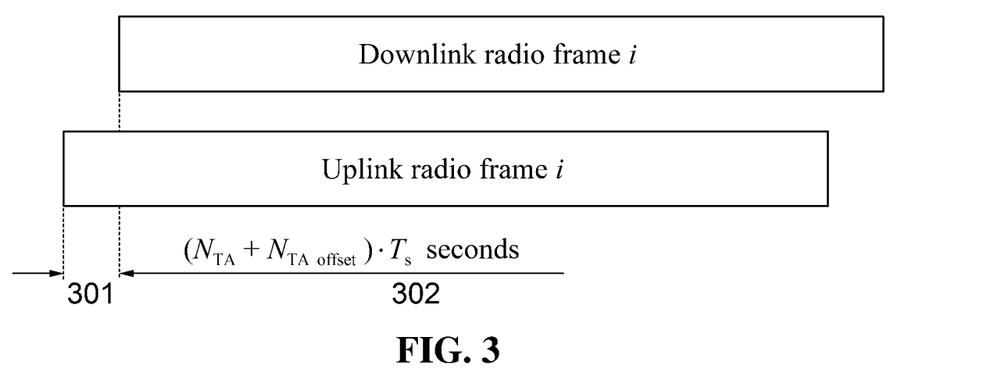
FIG. 3 is a diagram illustrating uplink transmission timing adjustment in a mobile communication system according to the $1^{st}$ embodiment of the present disclosure.

FIG. 3 is a diagram illustrating uplink transmission timing adjustment in a mobile communication system according to an embodiment of the present disclosure.

In OFDM mobile communication system, signal transmitted by transmitting device should arrive receiving device within a predefined time duration called CP (Cyclic Prefix). Within a cell, because of that more than one UEs can transmit uplink signal, uplink signals from plurality of UEs can arrive base station at different points of time according to the distance between each UE and base station. To compensate the difference of received uplink signal, each UE adjusts its uplink transmission timing with a certain amount of time in advance to a certain reference timing, which is called Timing Advance. The reference timing is the point of time when a certain downlink signal is received, e.g. the starting position/boundary of downlink radio frame (301). UE determines or configures its uplink radio frame transmission timing at the point of time which precede to the reference time by $(N_{TA}+N_{TA,offset})*T_s$ (302).

Ts is a time unit with a defined duration and has different value for each RAT. Ts used in LTE is denoted by $T_{S,LTE}$. Ts used in NR is denoted by $T_{S,NR}$.

$N_{TA,offset}$ is determined by the serving cell's frame structure and RAT. $N_{TA,offset}$ of LTE FS1 (FDD) is 0 and of LTE FS2 (TDD) is 624. $N_{TA,offset}$ of NR is determined by numerology or SCC. For example, $N_{TA,offset}$ of SCS 1 is offset 1, $N_{TA,offset}$ of SCS 2 is offset 2, $N_{TA,offset}$ of SCS 3 is offset 3 and so on. SCS 1, SCS 2 and SCS 3 can be 15 KHz, 30 KHz and 120 KHz respectively.

$N_{TA}$ is calculated by multiplying K by TA. TA is indicated in Timing Advance Command. Timing Advance Command is signaled/provided to the UE in RAR (Random Access Response) during random access procedure. Timing Advance Command can be signaled/provided to the UE in a specific MAC control information called Timing Advance Command MAC CE (Control Element). K is an integer greater than 0 and can be different depending on the cell. K is determined by a logical value indicated in the system information of the cell where uplink transmission timing adjustment is applied. Alternatively, K is determined by SCS of the cell where uplink transmission timing adjustment is applied.

TA command provided during random access initialize/adjust the uplink transmission timing with the reference of 301. TA provided in RAR during random access is defined per RAT and has $1^{st}$ size.

TA command provided in MAC CE during the normal operation which is not random access adjust the uplink transmission timing with the reference of the current uplink transmission timing. TA provided in TAC MAC CE is defined per RAT and has $2^{nd}$ size. $N_{TA,new}$ is equal to $N_{TA,old}+K*(TA-X)$, and X is equal to $2^{2nd\ size}/2$.

Figure 4:
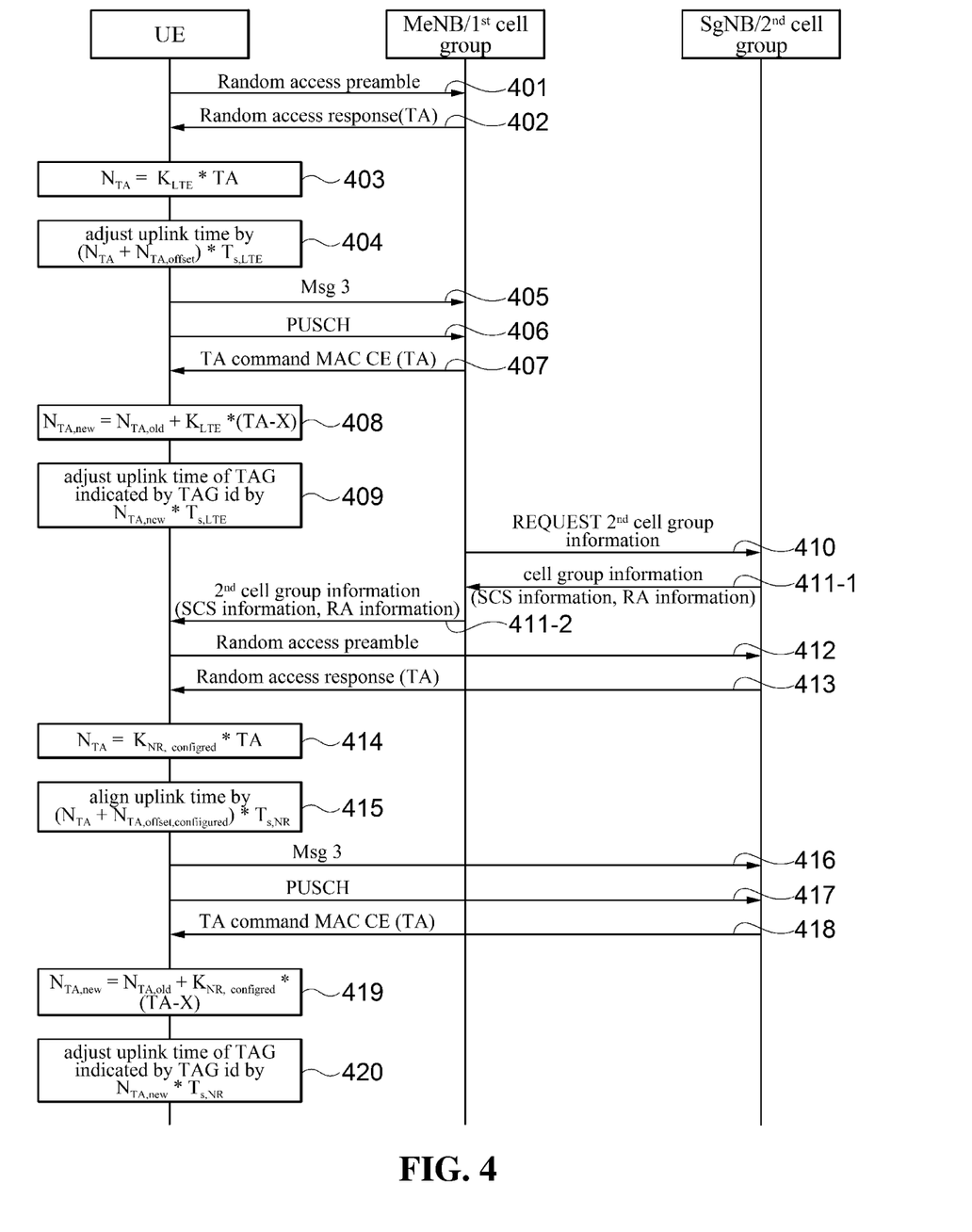
FIG. 4 is a signal flow diagram illustrating a procedure for transmitting and receiving signals at a UE and base station in a mobile communication system according to the $1^{st}$ embodiment of the present disclosure.

FIG. 4 is a signal flow diagram illustrating a procedure for transmitting and receiving signals at a UE and base station in a mobile communication system according to the 1st embodiment of the present disclosure.

UE operating in LTE or UE camping on a LTE cell starts random access procedure with MeNB. UE transmits random access preamble on PRACH resource of the cell with $N_{TA}=0$ 401.

MeNB 102 receives preamble on PRACH resource of one of its cell. MeNB determines $N_{TA}$ considering the point of time when the preamble is received. MeNB generates RAR including TA and transmits RAR. UE receives RAR including TA command 402.

UE calculates/determines $N_{TA}$ according to equation 1 403.

$$N_{TA}=K_{LTE}*TA \quad \text{Equation 1:}$$

$K_{LTE}$ is a predefined integer and can be 16.

UE adjust its uplink transmission timing with $N_{TA}$ as below 404.

1. the reference timing is starting boundary of downlink radio frame of Primary Cell
2. Adjusting the starting boundary of uplink radio frame by $(N_{TA}+N_{TA,offset,LTE})*T_{S,LTE}$ from the reference timing
3. $N_{TA,offset,LTE}$ is determined by the frame structure of the serving cell where preamble is transmitted.
4. $T_{S,LTE}$ is time unit for LTE and constant value defined in 3GPP Technical Specification (hereafter TS) 36.211

UE adjust the uplink transmission timing as above and transmits message 3 405.

UE transmits PUSCH on the first cell group with the uplink transmission timing adjusted as above until the uplink transmission timing is readjusted by the base station 406.

When the uplink transmission timing of the UE needs to be adjusted, base station adjusts the uplink transmission timing by TAC MAC CE. Upon reception of TAC MAC CE containing TA from a LTE cell of the first cell group, UE determines/calculates $N_{TA,now}$ using equation 2

$$N_{TA,new}=N_{TA,old}+K_{LTE}*(TA-X) \quad \text{Equation 2:}$$

TAC (Timing Advance Command) is consisted of 6 bit TA and 2 bit TAG identity. TAG (Timing Advance Group) is classified as either PTAG or STAG. Details can be found in 3GPP TS36.300 and TS36.321. UE adjusts the uplink transmission timing of the TAG indicated in the TAC MAC CE as below.

5. The reference uplink transmission timing is the current uplink transmission timing of the TAG indicated in the TAC MAC CE
6. UE adjust the uplink transmission timing of the TAG by $N_{TA,new}*T_{S,LTE}$ At some point of time, MeNB 102 decide to configure EN DC (LTE NR Dual Connectivity; more details can be found in Technical Specification 37.340) for the UE based on the measurement result reported by UE. MeNB sends SgNB a control message requesting SgNB to configure $2^{nd}$ cell group. EN DC UE is configured with two cell groups. $1^{st}$ cell group is consisted of LTE cells and controlled by MeNB. $2^{nd}$ cell group is consisted of NR cells and controlled by SgNB.

SgNB 103 determines serving cells for $2^{nd}$ cell group, generates control message including information regarding the cells and random access. SgNB 103 sends the control message to MeNB 411-1. The information included in the control message also carries logical information to identify SCS of the serving cells and whether beam correspondence holds during random access.

MeNB 102 transmits UE control message instructing UE to configure $2^{nd}$ cell group 411-2. The control message includes the SCS information, random access information and beam correspondence information that are delivered to MeNB at 411-1.

Bigger SCS means shorter time slot (TS 38.300) and shorter CP length. Smaller SCS means longer time slot and longer CP length. The relationship between SCS and the length of time slot/CP is predefined. The relevant information is stored by the UE in the non-volatile memory like ROM.

UE transmits random access preamble on the PRACH resource indicated in the control message with $N_{TA}=0$ 412.

SgNB receives preamble on the PRACH resource of a cell under its control, determines $N_{TA}$ considering the point of time when preamble is received and transmits random access response message including TA corresponding to the $N_{TA}$.

UE receives RAR including TA 413. UE determines $N_{TA}$ using equation 3 414.

$$N_{TA}=K_{NR,configured}*TA \quad \text{[Equation 3]}$$

$K_{NR,configured}$ is an integer specified by (determined from) the information contained in the $2^{nd}$ cell group information 411-2. Alternatively, $K_{NR,configured}$ is an integer determined from the SCS of the serving cell where uplink transmission timing adjustment is performed. $K_{NR,configured}$ is defined per SCS. UE determines SCS of the serving cell and input $K_{NR,configured}$ corresponding to the SCS to the equation 3. Alternatively, a logical identity indicating $K_{NR,configured}$ is delivered to the UE at 411-2. UE then determines $K_{NR,configured}$ based on the mapping information stored in the non-volatile memory.

Bigger SCS smaller $K_{NR,configured}$ and smaller SCS bigger $K_{NR,configured}$. The mapping relation between SCS and $K_{NR,configured}$ is linear. For example, if $K_{NR,configured}$ for SCS 15 KHz is n, then $K_{NR,configured}$ for SCS 30 KHz is n/2, $K_{NR,configured}$ for SCS 120 KHz is n/8 and so on. More generally, $K_{NR,configured}$ of a certain SCS can be determined from equation 4

$$K_{NR,configured,Target}=K_{NR,configured,Reference}/m \quad \text{Equation 4}$$

$K_{NR,configured,Target}$: $K_{NR,configured}$ corresponding to the target SCS (i.e. SCS in question)

$K_{NR,configured,Reference}$: $K_{NR,configured}$ corresponding to the reference SCS m: Target SCS/reference SCS For example, target SCS is 30 KHz, reference SCS is 15 KHz and $K_{NR,configured,Reference}$ is 16. Then $K_{NR,configured,Target}$ is 8 according to equation 3.

UE adjust its uplink transmission timing with $N_{TA}$ as below 415.

7. the reference timing is starting boundary of downlink radio frame of PSCell (Primary SCell, TS 37.340)
8. Adjusting the starting boundary of uplink radio frame by $(N_{TA}+N_{TA,offset,NR})*T_{S,NR}$ from the reference timing
9. $N_{TA,offset,NR}$ is determined by the SCS of the serving cell where preamble is transmitted. In the serving cell with large SCS, smaller value is used. In the serving cell with smaller SCS, larger value is used. $N_{TA,offset,NR}$ is predefined per SCS in specification. Alternatively, only reference $N_{TA,offset,NR}$ corresponding to a predefined SCS is predefined in the specification. $N_{TA,offset,NR}$ for other SCS can be determined by equation 3 like equation.
10. $T_{S,NR}$ is time unit for NR and constant value different from $T_{S,LTE}$ UE adjusts the uplink transmission timing as above and transmits message 3 416.

UE transmits PUSCH on the second cell group with the uplink transmission timing adjusted as above until the uplink transmission timing is readjusted by the base station 417.

When the uplink transmission timing of the UE needs to be adjusted, base station adjusts the uplink transmission timing by TAC MAC CE.

Upon reception of TAC MAC CE containing TA from a NR cell of the second cell group, UE determines/calculates $N_{TA,now}$ using equation 5

$$N_{TA,new}=N_{TA,old}+K_{NR,configured}*(TA-X) \qquad \text{[equation 5]}$$

TAC (Timing Advance Command) is consisted of 6 bit TA and 2 bit TAG identity. TAG (Timing Advance Group) is classified as either PTAG (Primary TAG) or STAG (Secondary TAG). Details can be found in 3GPP TS 36.300 and TS 36.321. UE adjusts the uplink transmission timing of the TAG indicated in the TAC MAC CE as below 420.

11. The reference uplink transmission timing is the current uplink transmission timing of the TAG indicated in the TAC MAC CE
12. UE adjust the uplink transmission timing of the TAG by $N_{TA,new}*T_{S,NR}$ 2nd Embodiment Battery consumption is an important issue in mobile communication system. In the $2^{nd}$ embodiment, a method and apparatus are provided to reduce the battery consumption by monitoring the control channel only during part of time according to a specific pattern. UE considers the 1st pattern defined individually per cell and the 2nd pattern applied common to multiple cells in monitoring downlink control channel. Base station transmits downlink control channel to the UE considering the 1st pattern and the 2nd pattern.

UE behavior for the 2nd embodiment is described below.

UE monitors control channel during the time duration where the 1st pattern and the 2nd pattern overlap each other.

The 1st pattern is the pattern that is applied to each of serving cell individually. One or more 1st pattern can be configured to a serving cell. In this case, union of the 1st patterns is the 1st pattern of the serving cell.

The 2nd pattern is the pattern that is commonly applied to plurality of serving cells.

The 1st pattern is static pattern which is not affected by uplink and downlink scheduling.

The 2nd pattern is dynamic pattern whose length change according to uplink and downlink scheduling. The $2^{nd}$ time duration of 2nd pattern is extended by a certain amount when uplink or downlink scheduling command for new transmission is received.

The 1st pattern is configured either by RRC control message or by system information. The 2nd pattern is configured by RRC control message.

Another UE behavior is as below.

UE acquires the information related to random access in the system information, transmits preamble and monitors PDCCH (Physical Downlink Control Channel) during RAR window to receive random access response.

When random access response is received, UE transmits RRC connection request message. When RRC connection establishment message including 1st pattern information is received, UE applies the 1st pattern for data transfer with the base station.

When UE receives from the base station RRC reconfiguration message including 2nd pattern information, UE stop applying 1st pattern and start applying 2nd pattern for data transfer with the base station.

When UE receives from the base station RRC reconfiguration message instructing release of 2nd pattern, UE stop applying 2nd pattern and start applying 1st pattern for data transfer with the base station.

The random access information provided from system information include the length of Random Access Response (hereafter RAR) window and common 1st pattern information.

RAR window starts when 1st duration elapses from the point of time when UE transmits preamble. RAR window has a certain maximum length (the 2nd duration). The length of 1st duration is determined by the SCS of the cell. The length of 2nd duration is determined by the SCS of the cell and the RAR window length indicated in the system information.

UE applies the common 1st pattern during RAR window in monitoring PDCCH.

Figure 5:
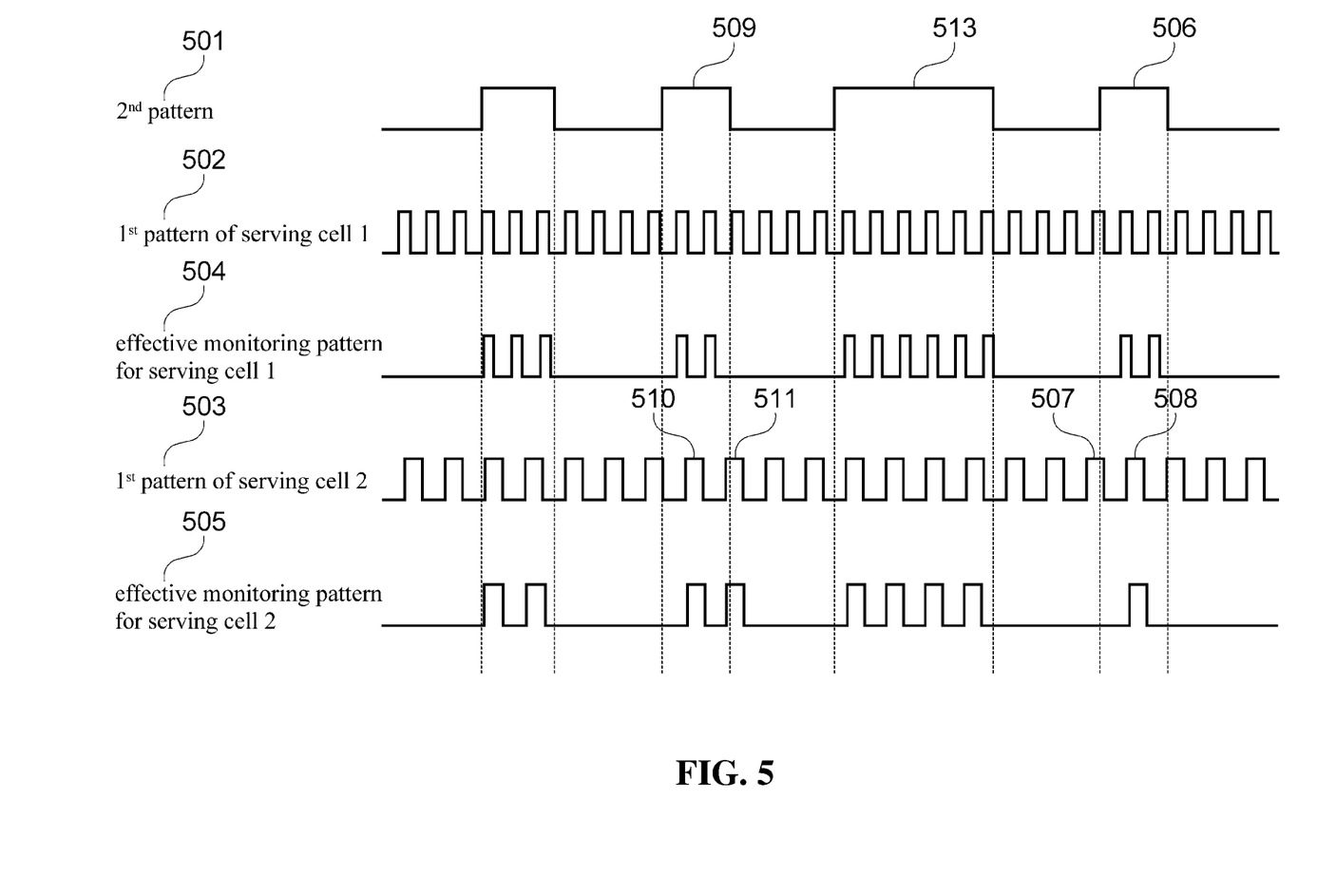
FIG. 5 is a diagram illustrating the first time pattern and the second time pattern according to an embodiment of the present disclosure.

FIG. 5 is a diagram illustrating the $1^{st}$ pattern and the $2^{nd}$ pattern according to an embodiment of the present disclosure.

The 1st pattern is configured by system information, RRC connection establishment message or RRC connection reconfiguration message. The 1st pattern is related with the downlink transmission beam. Base station transmits PDCCH and PDSCH to a UE via the optimum downlink transmission beam. Because of the characteristics of analogue beam, downlink transmission beams are transmitted in time division manner, UE only monitors PDCCH during time duration when its optimum transmission beam is transmitted. On the other words, the minimum time duration during which UE shall be awake to receive downlink control channel via optimum downlink transmission beam is 1st time duration. 1st time duration occurs regularly and periodically and consists the 1st pattern.

1st pattern 502, 503 is a pattern having 1st time duration 510, 514 with a fixed length which occurs repeatedly with a fixed periodicity. UE monitors downlink control channel during the 1st time duration and performs other tasks like measuring neighbor cells without monitoring the downlink control channel to reduce power consumption. If a UE is configured with multiple serving cells (i.e. carrier aggregation), 1st pattern is configured per serving cell individually (i.e. separate 1st pattern is configured to each of serving cell). For example, 502 is the 1st pattern configured to the serving cell 1 and 503 is the 1st pattern configured to the serving cell 2. 502 and 503 are independent patterns.

Multiple 1st patterns can be configured for a serving cell. UE considers the union of the 1st patterns as the 1st pattern of the serving cell.

2nd pattern 501 is a pattern having 2nd time duration 509 occur repeatedly with a fixed periodicity. The length of 2nd time duration is extended with a preconfigured amount of time when new data is scheduled to UE 513. Even when multiple serving cells are configured to a UE, a single 2nd pattern is commonly applied to the all serving cells.

UE, configured with serving cell 1 and serving cell 2 for carrier aggregation, determines the subset of pattern 2 501 and serving cell 1's pattern 1 504 as the effective monitoring pattern for serving cell 1. UE monitors PDCCH of serving cell 1 according to the monitoring pattern of serving cell 1.

UE determines the subset of pattern 2 501 and serving cell 2's pattern 1 504 as the effective monitoring pattern for serving cell 2. UE monitors PDCCH of serving cell 2 according to the monitoring pattern of serving cell 2.

The starting time point of 1st time duration and the starting time point of the 2nd time duration or the ending time point of 1st time duration and the ending time point of 2nd time duration may not be aligned with each other. In such case, only part of 1st time duration is overlapped with the 2nd time duration. UE determines the effective monitoring pattern based on a predefined rule. For example, among the 1st time durations that are overlapped with the 2nd time duration, the 1st time duration of which starting point precedes the starting point of 2nd time duration is not included in the effective monitoring pattern, but the 1st time duration of which starting point precedes the ending point of 2nd time duration is included in the effective monitoring pattern. In the FIG. 5 for example, 2nd time duration 506 is overlapped with 1st time duration 507 and 508. However, the starting point of 1st time duration 507 precedes the starting point of 2nd time duration 506 hence, 507 is not considered in the effective monitoring time duration and only 508 is considered. Even though 2nd time duration 509 and 1st time duration 511 partly overlaps, because the starting point of 1st time duration 511 precedes the ending point of 2nd time duration 509, UE monitors PDCCH of serving cell 2 during 1st time duration 511.

It is also possible to apply logically opposite rule. Among the 1st time durations that are included in the $2^{nd}$ time duration, the 1st time duration whose starting point precede the starting point of 2nd time duration is considered in the effective monitoring pattern (i.e. PDCCH is monitored during the 1st time duration). On the other hands, the partly overlapped 1st time duration whose starting point precede the ending point of 2nd time duration is not considered in the effective monitoring pattern.

Alternatively, the 1st time durations that are only partly overlaps with 2nd time duration are excluded in the effective monitoring pattern and the 1st time durations that are completely overlaps with 2nd time duration are included/considered in the effective monitoring pattern. As another alternative, all the 1st time durations that are overlaps with 2nd time duration are included/considered in the effective monitoring pattern (i.e. UE monitors PDCCH during 507 and 511).

Figure 6:
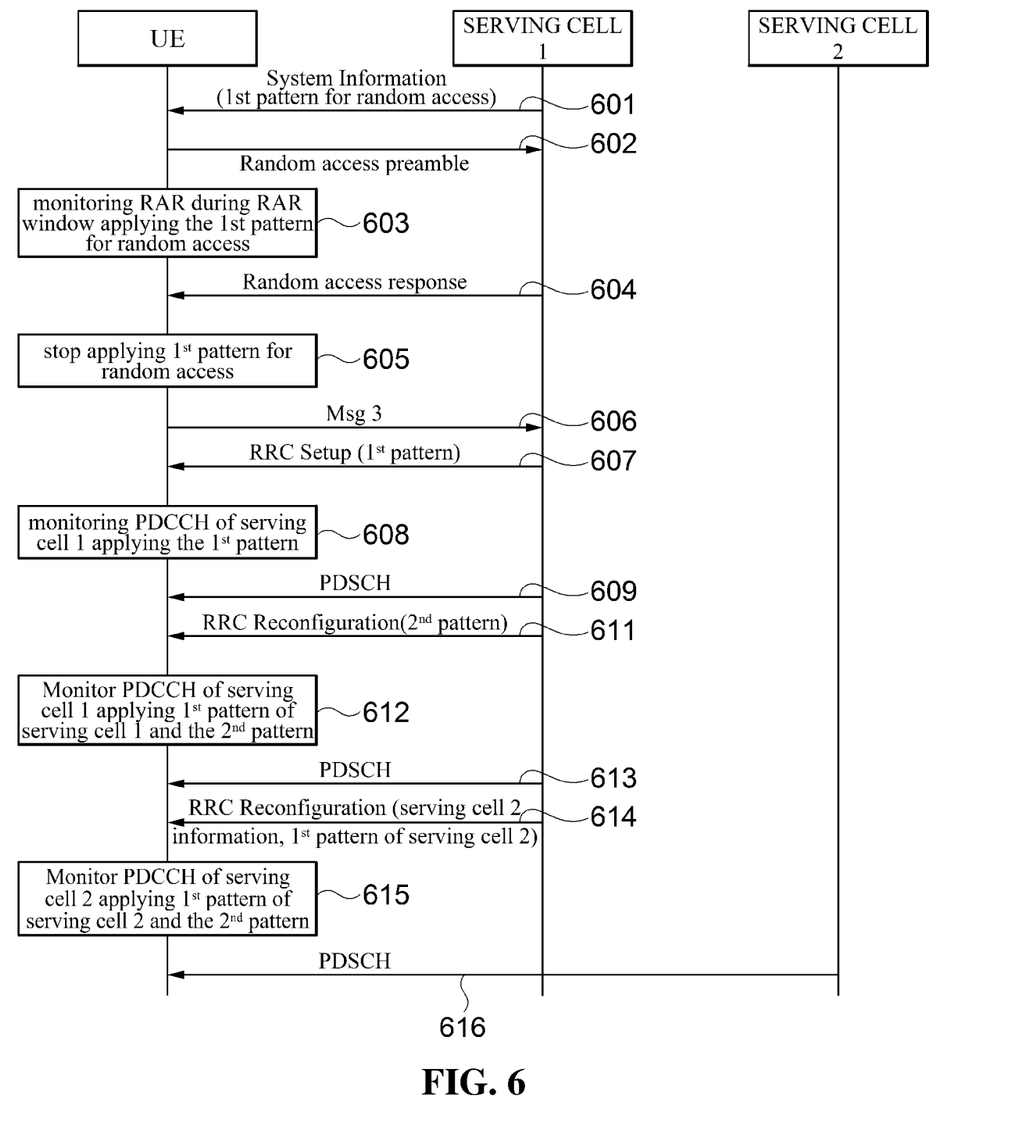
FIG. 6 is a signal flow diagram illustrating a procedure for transmitting and receiving signals at a UE and base station in a mobile communication system according to an embodiment of the present disclosure.

FIG. 6 is a signal flow diagram illustrating a procedure for transmitting and receiving signals at a UE and base station in a mobile communication system according to an embodiment of the present disclosure.

In the mobile communication system with serving cell 1, serving cell 2 and UE, serving cell 1 and serving cell 2 are controlled by a same base station or by different base stations.

UE camps on serving cell 1 and receives system information via PBCH (Physical Broadcast Channel) and PDSCH 601. The system information includes necessary information for UE to perform random access, e.g. random access preamble resource, preamble transmission power information and information for random access response reception. In addition UE acquires 1st pattern information for random access procedure.

1st pattern information for random access procedure includes the length and the periodicity of the 1st time duration in the number of symbols.

The starting point of time of the 1st time duration of the 1st pattern is determined either based on the point of time when preamble is transmitted or based on the starting time of RAR window.

At some point, UE starts to establish RRC connection in the serving cell 1. UE, to transmit RRC connection request message, transmits random access preamble on the PRACH resource of the serving cell 1 602.

UE, after transmitting random access preamble, monitors downlink control channel during RAR window to receive RAR. The length of RAR window is configurable and determined by the length information in the system information. RAR length information is a logical information and integer greater than 0. The actual RAR length corresponding to the logical information is determined by the SCS of the serving cell. In a cell with multiple SCSs used, a SCS called default SCS determines the length of the RAR window. Default SCS is the SCS used for initial access. Default SCS is applied to Sync signal and PBCH.

The length of RAR window is expressed by an integer in the predefined range. The integer means the number of slots or subframes. In LTE system, the length of the RAR window is defined by the number of subframes. In NR system, the length of the RAR window is defined by the number of slots (or symbols). In other words, if the length of the RAR window is N, it means the length of the RAR window is N subframes in LTE and N slots (or symbols) in NR.

In NR mobile communication system, symbol length and RAR window length are inversely proportional to the SCS. For example, when the length of RAR window is n, the actual RAR window length of a serving cell 1 with default SCS 15 KHz is two times longer than the actual RAR window length of a serving cell 2 with default SCS 30 KHz.

RAR window starts when a preconfigured time elapses since the preamble is transmitted. The time distance between the preamble transmission time and RAR window starting time (hereafter RAR offset) is also determined by the default SCS of the serving cell. RAR offset is indicated with the number of slots or symbols. Symbol length and slot length are inversely proportional to the default SCS of the serving cell.

The starting point of the 1st time duration is determined by the starting point of RAR window. For example, the starting point of the 1st time duration is same as the starting point of RAR window.

When RAR window starts, UE monitors PDCCH of the serving cell 1 with the common 1st pattern 603.

When UE receives valid RAR 604, UE stops applying the common 1st pattern 605. Or alternatively, UE continuously applies the common 1st pattern until random access procedure is completed. The valid RAR is the RAR including the response message for the preamble UE has transmitted.

The RAR message includes the uplink transmission resource information that UE can use to transmit message 3 (RRC connection request message). UE transmits message 3 using the allocated uplink resource 606.

Base station receiving the message 3 from the UE transmits UE RRC connection setup message. The message includes the signaling radio bearer information which is required for communication between UE and the base station. The message also includes dedicate 1st pattern information.

UE receives RRC connection setup message 607. If the message includes dedicate 1st pattern information, UE starts to apply the 1st pattern information when the configuration is completed according to the configuration information included in the message 608.

The 1st pattern UE acquires via system information in 601 is common 1st pattern. The 1st pattern UE acquires via dedicate RRC control message is dedicate 1st pattern.

The 1st pattern of the serving cell 1 is consisted of the length of the 1st time duration, the periodicity of the 1st time duration and the offset information. The length and the periodicity of the 1st time duration are defined by the number of OFDM symbols. Offset information indicates the starting point of 1st time duration. Offset information is consisted of time slot offset and symbol offset. UE determines the starting time slot based on the modulo operation using the time slot offset and periodicity of the 1st time duration. UE determines the starting symbol based on the slot offset.

UE monitors downlink control channel of serving cell with the 1st pattern. If downlink data transmission is indicated in the downlink control channel, UE receives the downlink data 609.

At some point of time, base station decides to apply the 2nd pattern to save the battery power of the UE. Base station transmits UE RRC connection reconfiguration message including 2nd pattern information 611. 2nd pattern information includes offset information regarding the starting point of 2nd time duration, the length of the 2nd time duration, the periodicity of the 2nd time duration and so on. The time unit for offset, length and the periodicity is time slot.

UE monitors downlink control channel of serving cell 1 considering both 1st pattern and 2nd pattern 612. More specifically, UE monitors PDCCH during the 1st time duration that are included within the 2nd time duration. If downlink data transmission is indicated in the downlink control channel, UE receives the downlink data 613.

At some point of time, base station decides to configure serving cell 2 to the UE to enable carrier aggregation.

Base station transmits UE RRC connection reconfiguration message including information about serving cell 2 (e.g. center frequency, bandwidth, cell identity and so on) and 1st pattern information of the serving cell 2 614.

UE monitors downlink control channel of serving cell 2 considering both 1st pattern of serving cell 2 and 2nd pattern 615. If downlink data transmission is indicated in the downlink control channel, UE receives the downlink data 616.

UE monitors PDCCH of serving cell 1 during the 1st time duration of the serving cell 1 that are included within the 2nd time duration, and monitors PDCCH of serving cell 2 during the 1st time duration of the serving cell 2 that are included within the 2nd time duration.

Figure 7:
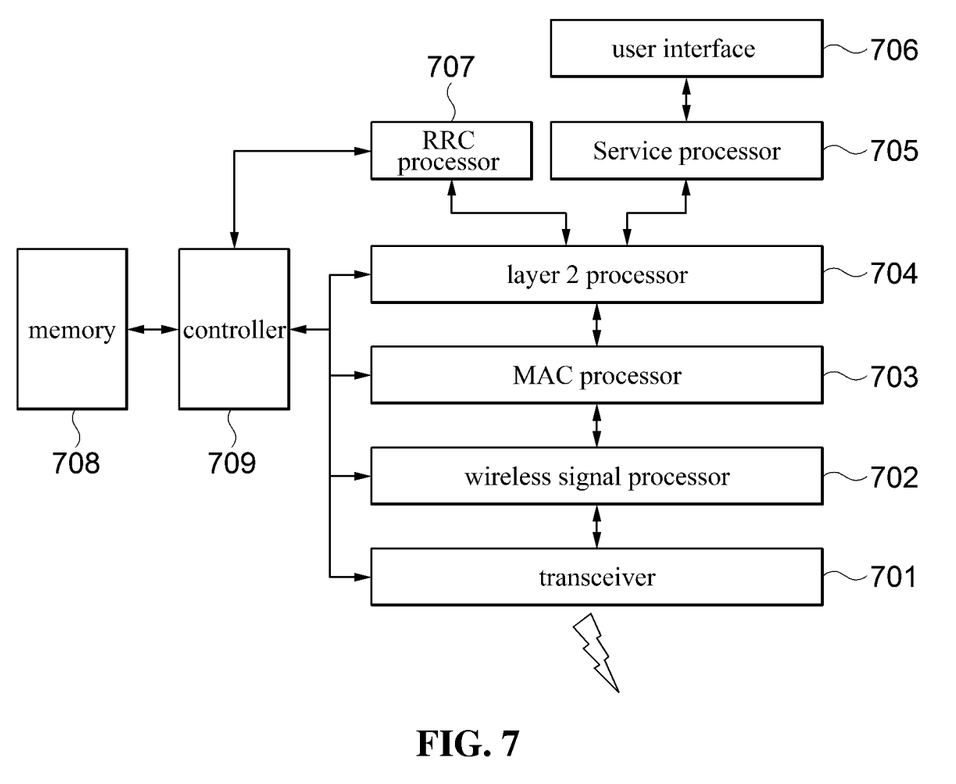
FIG. 7 is a block diagram illustrating a configuration of a UE according to various embodiments of the present disclosure.

FIG. 7 is a block diagram illustrating a configuration of a UE according to various embodiments of the present disclosure.

UE is consisted of transceiver 701, wireless signal processor 702, MAC processor 703, layer 2 processor 704, user interface 706, RRC processor 707, memory 708 and controller 709.

Transceiver 701 transmits the signal from wireless signal processor forward the received signal from the air interface to the wireless signal process.

Wireless signal processor processes the bit stream, received from the MAC processor, to wireless signal and forward the signal to the transceiver. Wireless signal processor processes the wireless signal, received from transceiver, to bit stream and forward the bit stream to the MAC processor.

MAC processor multiplexes the RLC PDUs, received from L2 processor, into a MAC PDU and forward the MAC PDU to the wireless signal processor. MAC processor demultiplexes MAC PDU, received from wireless signal processor, to RLC PDUs and forward RLC PDUs to the L2 processor. MAC processor forwards MAC control information/element included in the MAC PDU to the controller and multiplex MAC control information/element received from controller into a MAC PDU.

L2 processor is consisted of RLC processor and PDCP processor. L2 processor processes RRC control message, received from RRC processor, and IP packet, received from application/service processor, to RLC PDUs and forward the RLC PDUs to MAC processor. L2 processor processes RLC PDUs received from MAC processor into IP packets and forward them to Service processor.

Service processor receives user input from user interface and forward user output data to user interface. IP packets for wireless communication generated from applications are forwarded to L2 processor. IP packets for the applications are received from L2 processor.

User interface is consisted of display, speaker, virtual key board, microphone and other required equipment, software and middle ware.

Memory stores information from the controller and deliver stored information to the controller whenever necessary.

Controller controls the mobile communication. In the first embodiment, controller controls the process for uplink transmission timing adjustment. In the second embodiment, controller determines the 1st pattern and the 2nd pattern, and controls transceiver to monitor PDCCH during appropriate time duration in appropriate serving cell. Controller analyze the control information received from RRC processor and MAC processor and controls the other processors to perform required operations. Controller controls RRC processor and MAC processor to generate necessary control information.

Figure 8:
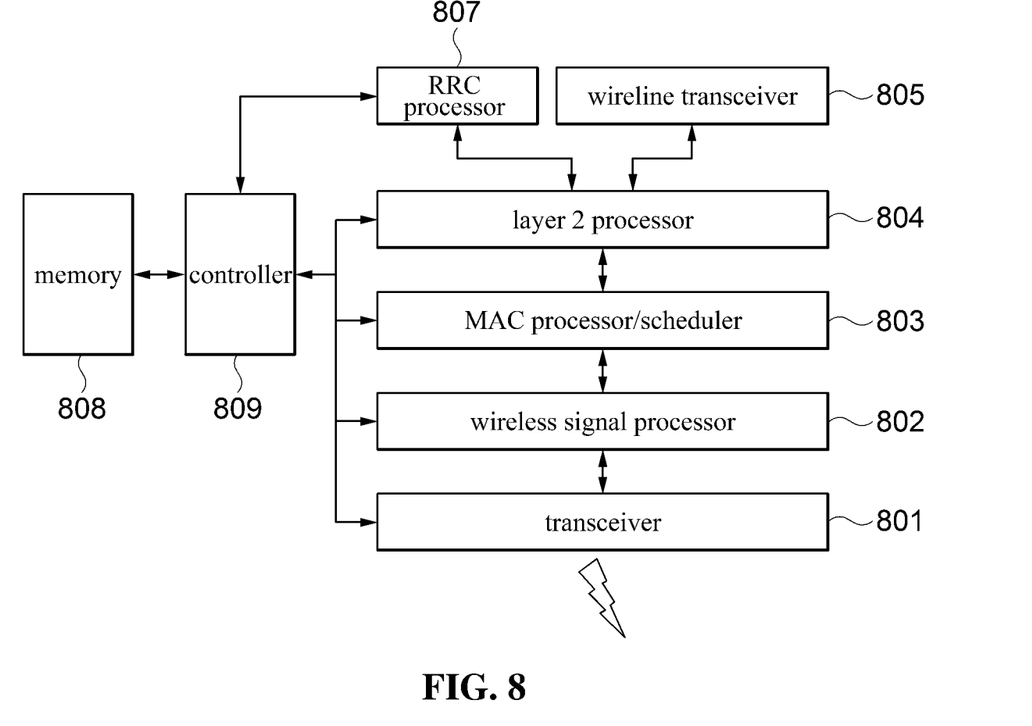
FIG. 8 is a block diagram illustrating a configuration of a base station according to various embodiments of the present disclosure.

FIG. 8 is a block diagram illustrating a configuration of a base station according to various embodiments of the present disclosure;

Base station is consisted of transceiver 801, wireless signal processor 802, MAC processor/scheduler 803, layer 2 processor 804, wireline transceiver 805, RRC processor 807, memory 808 and controller 809.

Transceiver transmits the signal from wireless signal processor and forwards the received signal from the air interface to the wireless signal process.

Wireless signal processor processes the bit stream, received from the MAC processor, to wireless signal and forwards the signal to the transceiver. Wireless signal processor processes the wireless signal, received from transceiver, to bit stream and forwards the bit stream to the MAC processor.

MAC processor multiplexes the RLC PDUs, received from L2 processor, into a MAC PDU and forward the MAC PDU to the wireless signal processor. MAC processor demultiplexes MAC PDU, received from wireless signal processor, to RLC PDUs and forward RLC PDUs to the L2 processor. MAC processor forwards MAC control information/element included in the MAC PDU to the controller and multiplex MAC control information/element received from controller into a MAC PDU. Scheduler performs scheduling for the UEs in the cells controlled by the base station.

L2 processor is consisted of RLC processor and PDCP processor. L2 processor processes RRC control message, received from RRC processor, and IP packet, received from wireline transceiver, to RLC PDUs and forward the RLC PDUs to MAC processor. L2 processor processes RLC PDUs received from MAC processor into IP packets and forward them to wireline transceiver.

Wireline transceiver transmits and receives data with core network node via wireline interface.

Memory stores information received from the controller and deliver stored information to the controller whenever necessary.

Controller controls the mobile communication. In the first embodiment, controller controls the process for uplink transmission timing adjustment. In the second embodiment, controller determines the $1^{st}$ pattern and the $2^{nd}$ pattern, and controls scheduler when to transmit PDCCH and PDSCH to UEs. Controller analyze the control information received from RRC processor and MAC processor and controls the other processors to perform required operations. Controller controls RRC processor and MAC processor to generate necessary control information.

Figure 9:
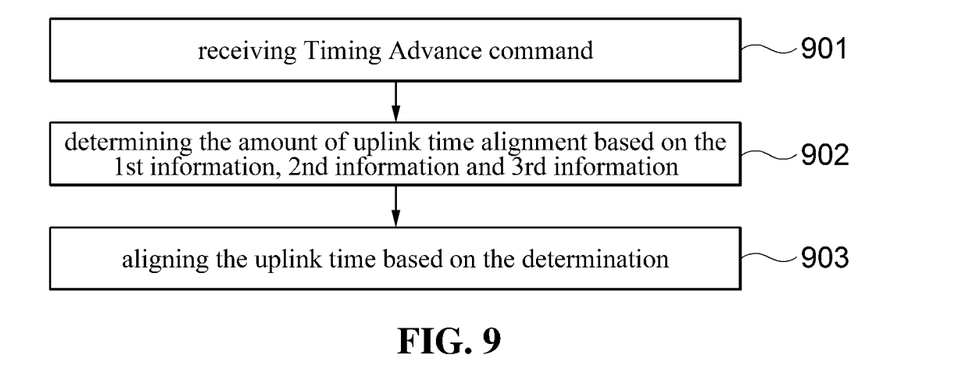
FIG. 9 is a flow chart illustrating uplink time adjustment procedure of UE according to the first embodiment of the present disclosure.

FIG. 9 is a flow chart illustrating uplink time adjustment procedure of UE according to the first embodiment of the present disclosure.

At operation of 901, UE receives Timing Advance command from a base station in a random access response message during a random access procedure.

At operation of 902, UE determines the amount of uplink time alignment based on the $1^{st}$ information, $2^{nd}$ information and $3^{rd}$ information. The $1^{st}$ information is received from Timing Advance command. The $2^{nd}$ information is derived from $4^{th}$ information which is derived from $5^{th}$ information. $5^{th}$ information is a logical information received from the base station and related with SCS. The $4^{th}$ information is related to SCS. The $3^{rd}$ and $4^{th}$ information are integer. The $3^{rd}$ information is equal to or greater than 0 and $4^{th}$ information is greater than 0. UE determines the amount of uplink time alignment by multiplying Ts and the sum of $2^{nd}$ information and $3^{rd}$ information. $2^{nd}$ information is derived by multiplying the $1^{st}$ information and $4^{th}$ information. $3^{rd}$ information is related to the SCS. $5^{th}$ is a logical information related to subcarrier spacing. $5^{th}$ information is received from a system information of the current serving cell. Alternatively, $5^{th}$ information is received from a RRC control message. The $5^{th}$ information received from the RRC message is the logical information for the SCS of a cell which is different from the cell where the RRC message is received.

At operation of 903, UE aligns the uplink time based on the determination made at 902.

Figure 10:
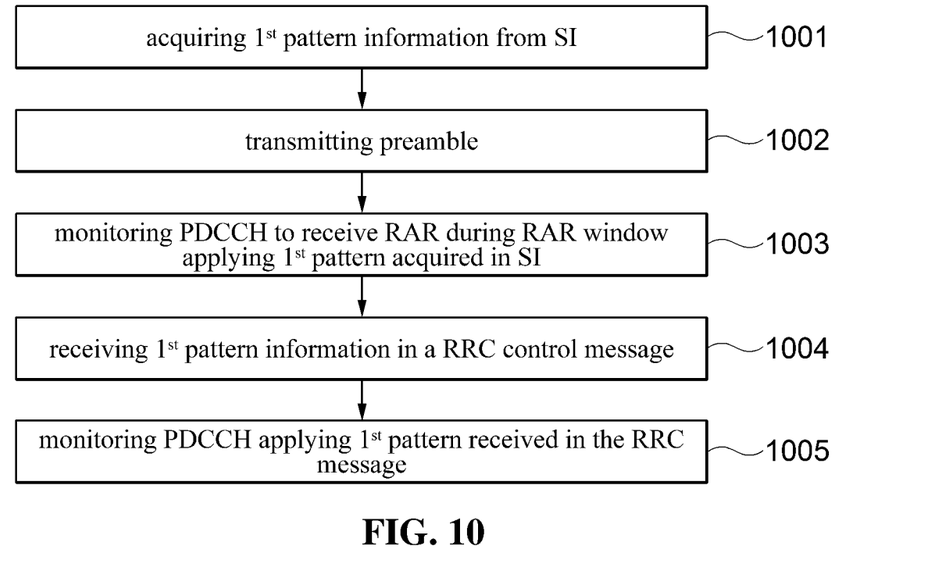
FIG. 10 is a flow chart illustrating random access procedure of a UE according to the various embodiments of the present disclosure.

FIG. 10 is a flow chart illustrating random access procedure of a UE according to the various embodiments of the present disclosure.

At operation of 1001, UE acquires $1^{st}$ pattern information from SI. UE also acquires from SI random access information.

At operation of 1002, UE transmits random access preamble on a random access resource.

At operation of 1003, UE monitors PDCCH to receive RAR during RAR window applying the $1^{st}$ pattern. The RAR window information is acquired from SI. The RAR window information includes a logical information, which is an integer greater than 0, and used for determining the length of the RAR window. The logical information is the number of slots. UE determines the RAR window length by considering the logical information and the default SCS. The starting point of RAR window is same as the starting point of a specific $1^{st}$ time duration of the $1^{st}$ time pattern. The time distance between the preamble transmission and RAR window is determined by the default SCS.

At operation of 1004, UE receives a RRC message including the $1^{st}$ pattern information.

At operation of 1005, UE monitors PDCCH by applying the $1^{st}$ pattern information received in the RRC message.

Figure 11:
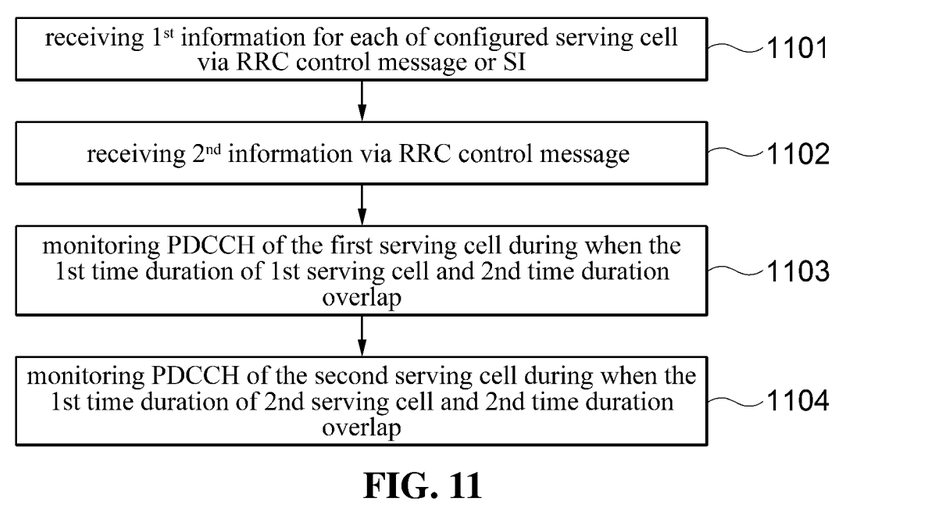
FIG. 11 is a flow chart illustrating PDCCH monitoring procedure of a UE according to the second embodiment of the present disclosure.

FIG. 11 is a flow chart illustrating PDCCH monitoring procedure of a UE according to the second embodiment of the present disclosure;

At operation of 1101, UE receives $1^{st}$ information for each of configured serving cell via RRC control message or via SI. The $1^{st}$ information defines the $1^{st}$ time durations for PDCCH monitoring specific to a serving cell. UE is configured with multiple of $1^{st}$ information if multiple serving cell is configured. $1^{st}$ time duration is static and not affected by downlink/uplink scheduling. If multiple $1^{st}$ information are configured for a serving cell, the union of the $1^{st}$ time durations is the effective $1^{st}$ time duration of the serving cell.

The $1^{st}$ information for a serving cell acquired from SI is overridden by the $1^{st}$ information for a serving cell received in a RRC control message.

At operation of 1102, UE receives $2^{nd}$ information via RRC control message. The $2^{nd}$ information defines the $2^{nd}$ time durations which are applied commonly to multiple of serving cells. The $2^{nd}$ time duration is dynamic and extended by a preconfigured amount of time upon downlink/uplink scheduling.

At operation of 1103, UE monitors PDCCH of the $1^{st}$ serving cell during when the $1^{st}$ time duration of $1^{st}$ serving cell and $2^{nd}$ time duration overlap.

At operation of 1104, UE monitors PDCCH of the second serving cell during when the $1^{st}$ time duration of $2^{nd}$ serving cell and $2^{nd}$ time duration overlap.

Meanwhile, the method for receiving and transmitting data in a mobile communication system with multiple SCS according to various exemplary embodiments of the present invention described above may be implemented in an installation data form and be provided in servers or devices in a state in which it is stored in various non-transitory computer readable media. Therefore, the respective apparatuses may access the servers or the devices in which the installation data are stored to download the installation data.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

What is claimed is:

1. A method performed by a terminal, the method comprising:
receiving, via a first cell, a radio resource control (RRC) message including logical information representing a subcarrier spacing (SCS) of a second cell and random access resource information of the second cell;
initiating a random access procedure in the second cell;
receiving a timing advance command during the random access procedure;
determining $N_{TA}$ by multiplying TA and K;
determining an amount of uplink time alignment based on the $N_{TA}$ and the $N_{TA,offset}$;
aligning-uplink time based on the determination; and
performing physical uplink shared channel (PUSCH) transmission on the second cell,
wherein the TA is a value indicated in the timing advance command received during the random access procedure,
wherein the SCS is determined from the logical information received in the RRC message,
wherein the K is a predetermined integer and determined from the SCS, and wherein a relationship between the K and the SCS satisfies the equation:

$$K=K_{reference}/m,$$

wherein the $K_{reference}$ is K of a reference SCS and the m is a quotient of the SCS over the reference SCS.

2. The method of claim 1, wherein:
the $N_{TA,offset}$ is related with the SCS, and
the $N_{TA,offset}$ is a value determined by the second cell.

3. The method of claim 1, wherein the first cell belongs to a master cell group and the second cell belongs to a second cell group.

4. The method of claim 1, wherein the RRC message is generated by a second base station associated with a second cell group and transmitted by a first base station associated with a first cell group.

5. A terminal in a wireless communication system, the terminal comprising:
a transceiver configured to transmit and receive a signal; and
a controller configured to control the transceiver to:
receive, via a first cell, a radio resource control (RRC) message including logical information representing a subcarrier spacing (SCS) of a second cell and random access resource information of the second cell,
initiate a random access procedure in the second cell,
receive a timing advance command during the random access procedure,
determine $N_{TA}$ by multiplying TA and K,
determine an amount of uplink time alignment based on the $N_{TA}$ and $N_{TA,offset}$;
align uplink time based on the determination; and
perform physical uplink shared channel (PUSCH) transmission on the second cell,
wherein the TA is a value indicated in the timing advance command received during the random access procedure,
wherein the SCS is determined from the logical information received in the RRC message,
wherein the K is a predetermined integer and determined from the SCS, and
wherein a relationship between the K and the SCS satisfies the equation:

$$K=K_{reference}/m,$$

wherein the $K_{reference}$ is K of a reference SCS and the m is a quotient of the SCS over the reference SCS.

6. The terminal of claim 5, wherein
the $N_{TA,offset}$ with related to the SCS, and
the $N_{TA,offset}$ is a value determined by the second cell.

7. The terminal of claim 5, wherein the first cell belongs to a master cell group and the second cell belongs to a second cell group.

8. The terminal of claim 5, wherein the RRC message is generated by a second base station associated with a second cell group and transmitted by a first base station associated with a first cell group.

9. A base station apparatus for controlling uplink transmission timing, the base station apparatus comprising:
a transceiver configured to transmit and receive a signal; and
a controller configured to control the transceiver to:
receive a radio resource control (RRC) message, from another base station controlling a second cell, including logical information representing a subcarrier spacing (SCS) of the second cell and random access resource information of the second cell,
transmit the RRC message to User Equipment (UE);
receive a preamble from the UE,
determine TA based on $N_{TA}$ and K, and
transmit timing advance command indicating the determined TA to the UE,
wherein the $N_{TA}$ is a value indicating an amount of uplink time alignment,
wherein the SCS is determined from the logical information received in the RRC message,
wherein the K is a predetermined integer and determined from the SCS, and
wherein a relationship between the K and the SCS satisfies the equation:

$$K=K_{reference}/m,$$

wherein the $K_{reference}$ is K of a reference SCS and the m is a quotient of the SCS over the reference SCS.

* * * * *